United States Patent
Laumen et al.

(10) Patent No.: US 7,076,273 B2
(45) Date of Patent: Jul. 11, 2006

(54) METHOD FOR CONTROLLING A MULTIMEDIA MESSAGING SERVICE BETWEEN A TELECOMMUNICATION DEVICE AND A TELECOMMUNICATION NETWORK, RESPECTIVE SMART CARD AND TELECOMMUNICATION DEVICE

(75) Inventors: Josef Laumen, Hildesheim (DE); Andreas Schmidt, Braunschweig (DE); Marcel Schutte, Munich (DE); Sabine Van Niekerk, Salzgitter (DE)

(73) Assignee: Siemens Aktiengesellschaft, Munich (DE)

( * ) Notice: Subject to any disclaimer, the term of this patent is extended or adjusted under 35 U.S.C. 154(b) by 225 days.

(21) Appl. No.: 10/702,795

(22) Filed: Nov. 5, 2003

(65) Prior Publication Data

US 2004/0147284 A1 Jul. 29, 2004

(30) Foreign Application Priority Data

Nov. 5, 2002 (EP) .................................. 02024664
Aug. 13, 2003 (EP) .................................. 03018397

(51) Int. Cl.
*H04M 1/00* (2006.01)
(52) U.S. Cl. ...................... 455/558; 455/557; 455/466; 455/556.1; 455/411
(58) Field of Classification Search ................. 455/412, 455/466, 558, 411, 556, 557; 709/221, 219, 709/206; 705/16; 725/98
See application file for complete search history.

(56) References Cited

U.S. PATENT DOCUMENTS

| | | | |
|---|---|---|---|
| 6,629,130 B1* | 9/2003 | Mertama et al. ............ | 709/206 |
| 2002/0087656 A1* | 7/2002 | Gargiulo et al. ............ | 709/217 |
| 2003/0013483 A1* | 1/2003 | Ausems et al. ............. | 455/556 |
| 2003/0040299 A1* | 2/2003 | Laumen et al. ............. | 455/412 |
| 2003/0101246 A1* | 5/2003 | Lahti .......................... | 709/221 |
| 2003/0119552 A1* | 6/2003 | Laumen et al. ............. | 455/557 |
| 2003/0190908 A1* | 10/2003 | Craven ....................... | 455/411 |
| 2003/0224823 A1* | 12/2003 | Hurst et al. ................. | 455/558 |
| 2004/0030601 A1* | 2/2004 | Pond et al. ................... | 705/16 |
| 2004/0068747 A1* | 4/2004 | Robertson et al. ............ | 725/98 |
| 2004/0097248 A1* | 5/2004 | Schmidt et al. ............. | 455/466 |
| 2004/0106416 A9* | 6/2004 | Michaels et al. ........... | 455/466 |
| 2004/0117459 A1* | 6/2004 | Fry ............................ | 709/219 |
| 2004/0209649 A1* | 10/2004 | Lord .......................... | 455/558 |

* cited by examiner

Primary Examiner—Eliseo Ramos-Feliciano
Assistant Examiner—Michael T. Vu
(74) Attorney, Agent, or Firm—Bell, Boyd & Lloyd LLC

(57) ABSTRACT

For controlling a multimedia messaging service (MMS) between a telecommunication device (ME) and a telecommunication network (NET), the transport commands (SM) and/or the data transfer (DO) of each multimedia message to and from the telecommunication device (ME) are controlled by a smart card (SC) being coupled with the telecommunication device (ME).

41 Claims, 6 Drawing Sheets

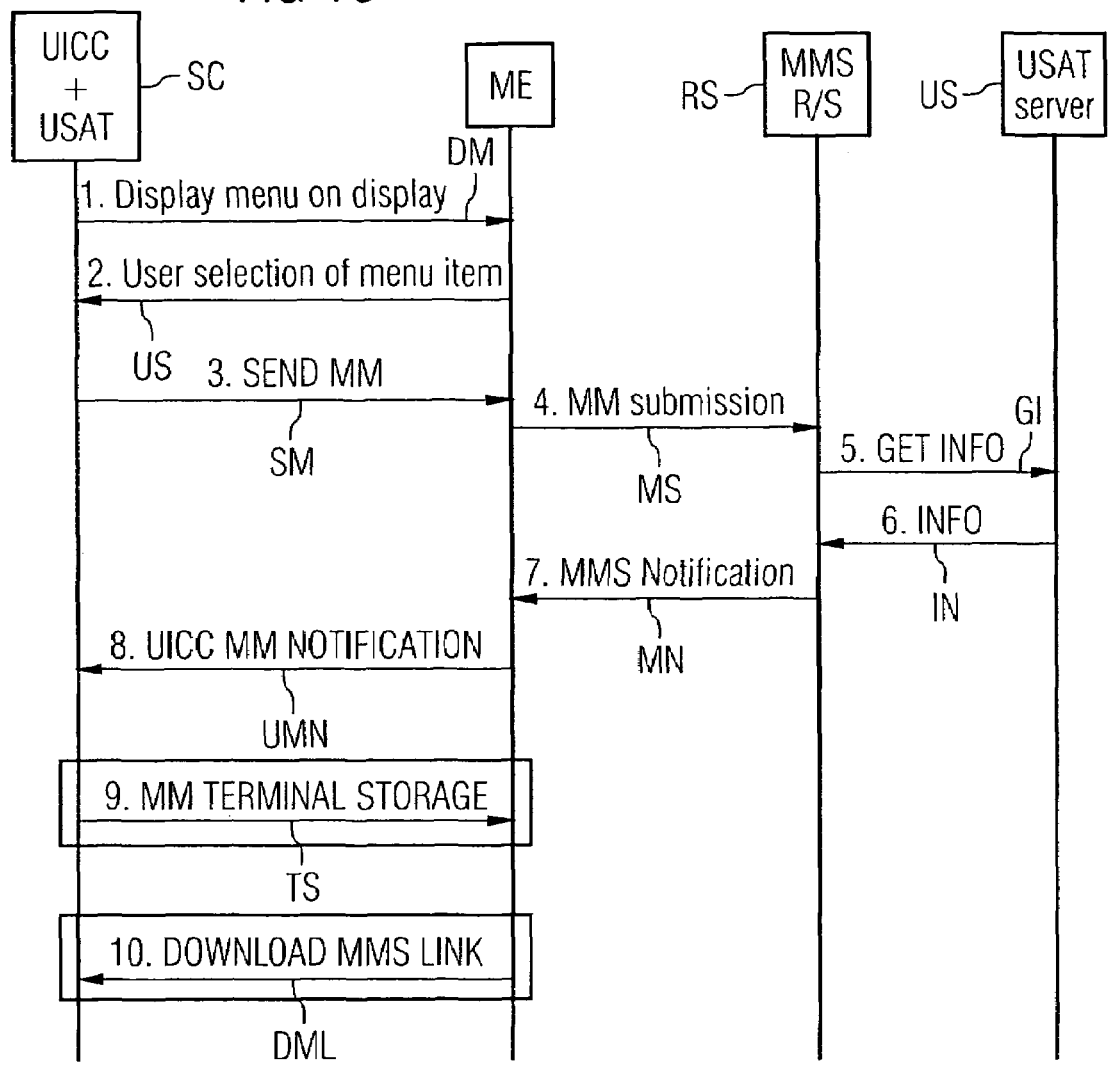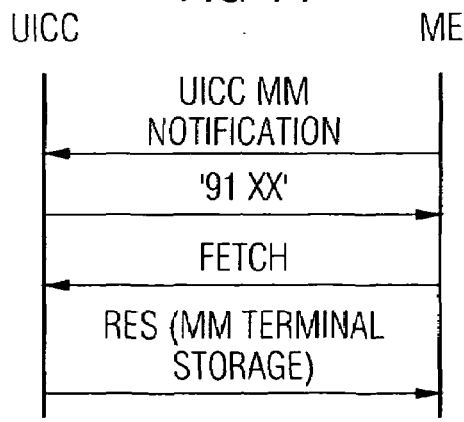

METHOD FOR CONTROLLING A MULTIMEDIA MESSAGING SERVICE BETWEEN A TELECOMMUNICATION DEVICE AND A TELECOMMUNICATION NETWORK, RESPECTIVE SMART CARD AND TELECOMMUNICATION DEVICE

BACKGROUND OF THE INVENTION

In respective mobile telecommunication systems, such as GSM (Global System for Mobile communications) and UMTS (Universal Telecommunication System), operators have the possibility to use SAT (SIM Application Toolkit (SIM=Subscriber Identity Module)) or USAT (USIM Application Toolkit (USIM=UMTS Subscriber Identity Module)) mechanisms in order to define network operator-specific applications. These applications reside on a UICC/SIM card (Universal IC Card; IC: Integrated Circuit) and use certain functionalities of the mobile phone, where the UICC/SIM card is usually plugged in or is otherwise coupled with. Further such details are particularly described in specification documents 3GPP TS 31.111, USIM Application Toolkit (Release 5); 3GPP TS 31.111, USIM Application Toolkit (Release 5); 3GPP TS 23.140, Multimedia Messaging Service (MMS), Functional description, stage 2; 3GPP TS 31.102, Characteristics of the USIM Application (Release 5); and in W. Rankl, W. Effing, Smartcard Handbook, John Wiley & Sons, second edition, 2000.

Mobile communication services such as the 2nd generation (e.g., GSM) and the 3rd generation (e.g., UMTS) use well-defined smart cards in addition to telecommunication devices like mobile phones. Plugged into a telecommunication device like a mobile phone, these smart cards enable a user to use the mobile communication service he/she has subscribed to. Moreover, user preferences and settings, as well as a user's personal information, can be stored on such smart cards. In GSM these cards are called SIM. In UMTS, one distinguishes between the physical card (the UICC) and its logical functionality (the USIM).

CAT/SAT/USAT (Card Application Toolkit/SIM Application Toolkit/USIM application Toolkit) is a toolkit which provides operators with an API (Application Programming Interface), which enables them to put their own, network operator-specific applications on a SIM or a UICC card taking into account the particularities of mobile phones, independent of the particular operator, smart card manufacturer and mobile phone manufacturer. For that purpose, CAT/SAT/USAT provides a standardized execution environment for applications stored on the SIM/USIM/UICC and the ability to utilize certain functions of the supporting mobile equipment, particularly a telecommunication device (below abbreviated by ME ); i.e., the mobile phone. CAT/SAT/USAT provides mechanisms, which allow applications, residing in the UICC/JUSIM/SIM, to interact and operate with any ME which supports the specified mechanism(s), thus ensuring interoperability between a UICC/USIM/SIM and an ME, independent of the respective manufacturers and operators. The UICC/SIM card is the physical basis for this toolkit since UICC/SIM are usually owned by the operator and can, thus, be adapted most easily to the operator's needs. Examples of such USAT mechanisms are the (U)SAT proactive commands (often also called proactive UICC commands) like DISPLAY TEXT, GET INPUT, PLAY TONE, RECEIVE DATA, SEND DATA, SEND SHORT MESSAGE, SET UP CALL, etc, of which applications residing on the USIM/UICC can make use of. Since only the mobile equipment can act as the master in the communication between the ME (mobile equipment) and the UICC/SIM, the proactive (U)SAT commands are defined to create a way for the UICC/SIM to indicate, that the UICC/SIM wants to send a command to the ME. That is, the UICC uses the proactive (U)SAT commands to issue instructions to the ME. The ME knows what action it has to take when it receives this kind of instruction.

Nowadays, in mobile networks like GSM, SMS (Short Message Service) is used to send and receive short messages between mobile terminals. Currently, a new messaging service, the so-called MMS (Multimedia Messaging Service), is being standardized. Contrary to SMS, MMS messages may contain multimedia elements such as for example, text, still image, audio or video. MMS is a peer-to-peer messaging service between two MMS User Agents (or between an MMS User Agent and a 3rd Party Value-Added Service Provider, VASP), which are both connected to an MMS Relay/Server. The MMS User Agent resides either on a mobile phone (e.g., a UMTS-UE (UE abbreviation for User Equipment)) or a GSM-MS (MS abbreviation for Mobile Station), on an external device; for example, a notebook/laptop, coupled or connected to a mobile phone, or even on a PC or other telecommunication devices not connected or not coupled to a mobile phone. It is an application layer function on the respective telecommunication equipment that provides the user with the ability to view, compose and handle the Multimedia Messages (below abbreviated by MMs), including submission and reception of MMs. A MMS Relay/Server is a network entity responsible for the storage and handling of incoming and outgoing messages and for the transfer of the message between different messaging systems.

To summarize, the Multimedia Messaging Service (MMS) is a new messaging service, with which messages with multimedia elements of different types (e.g. still image, audio, video) and different formats (with respect to still image: e.g., JPEG or GIF) can be exchanged between (especially mobile) terminals via network components or directly with each other.

SUMMARY OF THE INVENTION

It is an object of the present invention to bring about a method for controlling a multimedia messaging service between a telecommunication device and a telecommunication network in a simple and efficient way for a network operator.

This objective is accomplished by a method for controlling a multimedia messaging service between at least one smart card, a telecommunication device and a telecommunication network, wherein the commands and/or the data transfer of each multimedia message to and from the telecommunication device are controlled by the smart card being coupled with the telecommunication device.

Thus, a network operator is enabled to control the handling, (e.g., composing, changing, erasing, or any other kind of manipulating), of the respective multimedia message, one or several parts of it, or references to at least one part or all of it in a efficient and simple way.

Further, the present invention relates to a smart card for controlling a multimedia messaging service between a telecommunication device and a telecommunication network, wherein the transport commands and/or the data transfer of each multimedia message to and from the telecommunication device are controlled by the smart card being coupled with the telecommunication device, particularly wherein the controlling is performed according to the inventive method.

The present invention also relates to a telecommunication device being coupled with such a smart card.

Additional features and advantages of the present invention are described in, and will be apparent from, the following Detailed Description of the Invention and the Figures.

BRIEF DESCRIPTION OF THE FIGURES

FIG. 10 illustrates a further signalling scheme between the smart card, the telecommunication device and the components of the telecommunication network of FIG. 1 for controlling the retrieval of a reference or link to a respective multimedia message from the telecommunication network to the smart card.

FIG. 11 illustrates as a detail of the signalling scheme of FIG. 10 the interaction of commands between the smart card and the telecommunication device to get a "MM terminal storage command" to be sent from the smart card to the telecommunication device, thus initiating the telecommunication device to retrieve the link of the respective multimedia message from the network, download it to the smart card, and/or display it or its linked attachment.

DETAILED DESCRIPTION OF THE INVENTION

Like reference signs refer to corresponding parts and elements throughout FIGS. 1–11. There, inventive transport commands for controlling a multimedia messaging service (below abbreviated by MMS) between a telecommunication device and a telecommunication network by a smart card and data transfers associated with these commands are indicated by bold frames.

EXAMPLE 1

Figure 1:
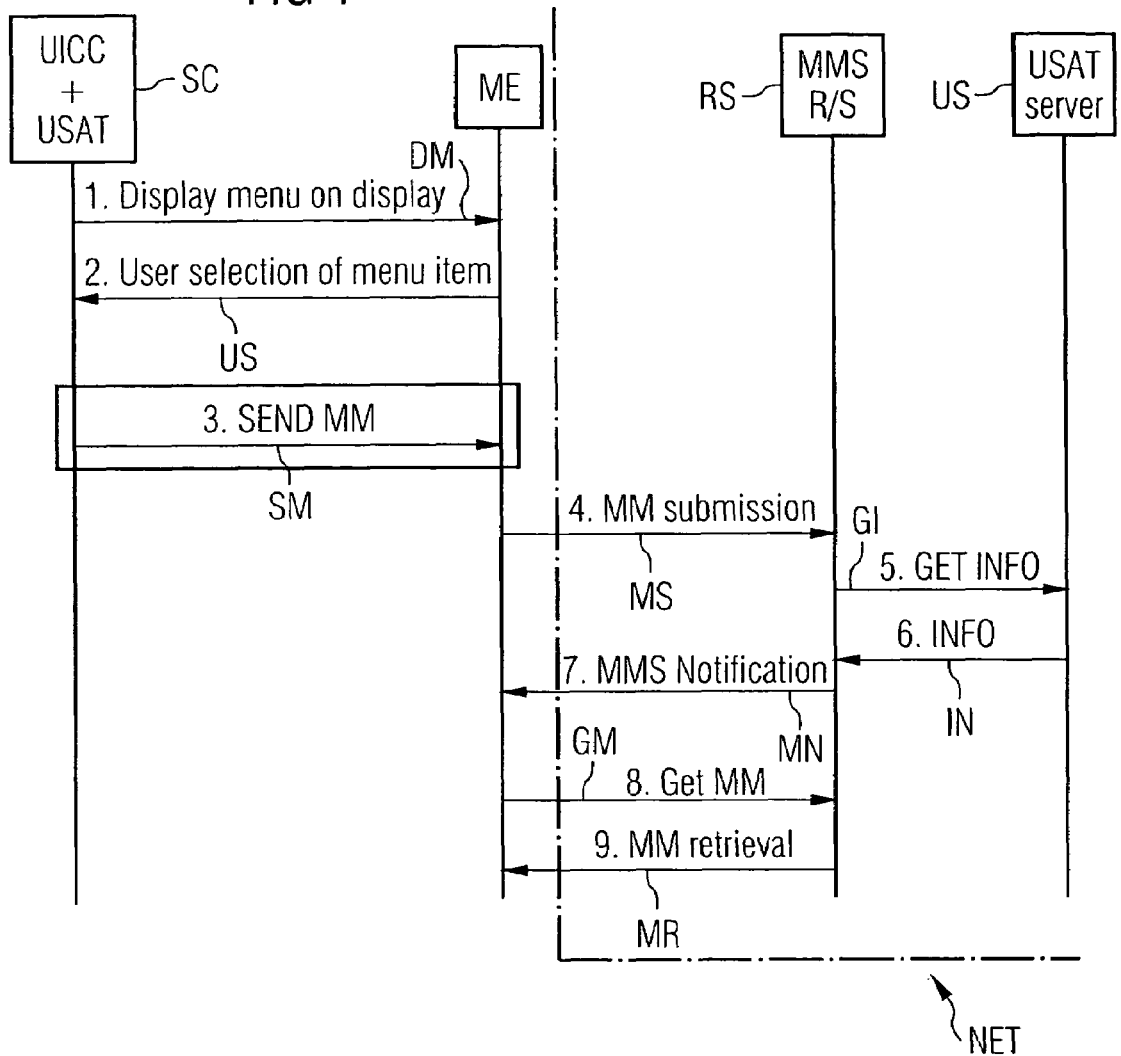
FIG. 1 illustrates a first signalling scheme between a smart card, a telecommunication device and components of a telecommunication network for controlling the composition and submission of a respective multimedia message in the telecommunication device by the smart card according to a first embodiment of the present invention.

According to a first embodiment of the present invention, the following examples for the usage of MMS as bearer service for (U)SAT is discussed. In FIG. 1, the UICC (or SIM card) contains a (U)SAT application and resides on a smart card SC. The (U)SAT application is activated. In addition, the terminal ME (where the UICC/SIM card is plugged in) runs an MMS User Agent; i.e., MMS functionality is residing on the terminal.

EXAMPLE 1a

Operator X provides the subscribed users with an USAT application, which allows the user to receive the weather forecast as multimedia content by using MMS. This can be, for example, multimedia presentation of the weather forecast with text, still images, audio, video, etc. Typically, such an application is pre-installed on the smart card SC at the time of issuing the card. An example of this is shown in FIG. 1.

User Y wants to know what kind of weather it will be tomorrow in Germany, especially in Berlin, the city the user lives in, for example. Thus, user Y starts the weather application on his/her telecommunication device ME, particularly a mobile phone, and the weather application menu will be displayed on the telecommunication device's display by command DM (indicated by sequence number 1 in FIG. 1). Thereafter, user Y selects the weather forecast for Berlin, Germany from the menu of the USAT weather forecast application on his/her mobile phone by command US (indicated by sequence number 2 in FIG. 1). USAT will send the proactive UICC command SEND MM to the ME by command SM (indicated by sequence number 3 in FIG. 1). This message consists of the information, which the ME needs to send an MM to the USAT server for the weather forecast of Berlin, Germany; e.g., headers, attachments, link to attachments, address of the USAT application server, etc. With the information included in this SEND MM command the MMS UA composes an MM and sends it to the MMS Relay/Server RS by command MS (indicated by sequence number 4 in FIG. 1). The MMS Relay/Server RS forwards this Multimedia Message (abbreviated by MM) to the USAT server (or VAS server (VAS=value added server)) US by command GI (indicated by sequence number 5 in FIG. 1). The MMS Relay/Server RS and the USAT server US are components of the telecommunication network NET, which is indicated by a dashed line in FIG. 1. The USAT server reads the MM and sees that the user requests the weather forecast of Berlin, Germany. The USAT server collects the latest weather forecast information of Berlin and composes an MM containing a multimedia weather forecast presentation with text, still images audio, video about the weather forecast of Berlin and sends it to the MMS Relay/Server by command IN (indicated by sequence number 6 in FIG. 1). The MMS Relay/Server sends a notification to the MMS UA by command MN (indicated by sequence number 7 in FIG. 1). The user is notified about the new MM including the weather forecast. The user can request MM retrieval now by command GM (indicated by sequence number 8 in FIG. 1) and the MM retrieval procedure will be started now by command MR (indicated by sequence number 9 in FIG. 1). After the MM retrieval, the user can watch the weather forecast of Berlin on his/her mobile phone.

Figure 2:
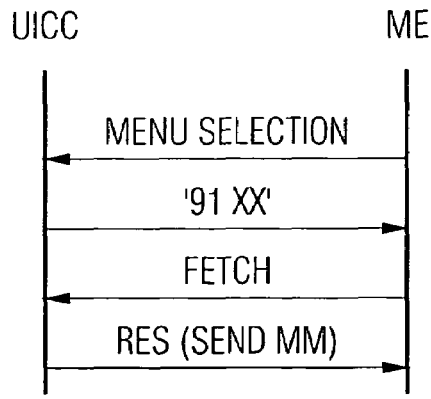
FIG. 2 illustrates as a detail of the signalling scheme of FIG. 1 the interaction of commands between the smart card and the telecommunication device to get a "send MM command" to be sent from the smart card to the telecommunication device, thus enabling the telecommunication device the composition of the respective multimedia message and its submission to the network.

A more detailed description of the proactive UICC command "SEND MM" is described below with reference to FIG. 2:

In the communication between the ME and the UICC/SIM, only the ME can act as the master, with the UICC/SIM acting as a slave. However, the UICC/SIM advantageously has the possibility to indicate that a command has to be fetched (transfer an Application Toolkit command from the SIM to the ME) by the ME. This is accomplished as follows. The UICC/SIM responds to every communication with the mobile phone with a status word, indicating the successful or unsuccessful outcome of the communication. With a special status word ("91 XX") the UICC/SIM indicates that the UICC/SIM wants to send a proactive (U)SAT command, whereupon the ME fetches the data. These commands are also called proactive UICC commands and are (U)SAT commands.

In this example, accordingly, after the user has selected the "weather forecast of Berlin, Germany" item from his/her menu, the UICC/SIM answers with the status word "91 XX" indicating that a (U)SAT command is waiting. The ME fetches the data with the SEND MM command (see FIG. 2). The ME executes the predefined action upon reception of the SEND MM command; namely, the ME composes an MM, based on the information in the SEND MM command, and sends the MM to the addressee indicated in the SEND MM command, in this case the USAT server.

With the SEND MM command, the UICC requests from the ME to compose an MM and submit it to the network based on the information conveyed with the command. The SEND MM command consists of all the information which the MMS User Agent needs to compose and submit an MM as requested. The information preferably provided in the SEND MM command (denoted by reference sign SM in FIG. 1) is shown in Table 1 attached below:

TABLE 1

Command parameters of the proactive UICC "SEND MM" command

| Command parameter | Description |
|---|---|
| Command details | The command details conveyed in the "SEND MM" command contain information to the user command (in this case the "SEND MM" command). It consists of, for example: A command number, which identifies the command in case of multiple ongoing commands. That is, the command number conveyed in the "SEND MM" command is copied by the ME into a response to this command. As such, it allows for an unambiguous mapping of responses to commands by the UICC. A type of command which identifies the command, in this case the "SEND MM" command. A command qualifier to the user "SEND MM" command. |
| Device entities | The device entities consist of the source identity, which identifies the source device (here, UICC), and the destination identity (here, ME), which identifies the destination device. |
| Connectivity parameters | MMS connectivity information consists of a set of information elements needed to access network infrastructure for the MMS purpose. This includes bearer, protocols, and addresses of related access points. A list of MMS connectivity parameters is defined in [4]. If this information is conveyed in the SEND MM command then the UICC requests from the ME to use the indicated set of parameters when connecting to the network for the purpose of sending this particular MM. |
| MM content | The "MM content" field consists of all the attachments which have to be added to the MM; e.g., text, still image, audio, video, etc. With the MM content in the "MM content" field in the "SEND MM" command, the ME will compose the MM by inserting the conveyed content, which can be one or more objects, as attachments into the MM. |
| Link to MM content | In a "Link to MM content" field, the UICC may indicate content (e.g., text, still image, audio, video, etc.) by a reference or multiple references (in case of more than one object) to that content. For example, with a reference/link pointing to content stored on the terminal or elsewhere inside or outside the UICC. If this field is present in the SEND MM command, then the UICC requests from the ME to retrieve the content which is pointed to by the "Link to MM content" reference(s) and to insert it as attachment(s) into the MM. => content |
| Header fields | The header fields consist of the header fields which the MMS User Agents needs to compose an MM. These header fields either can be (a subset of) those defined by the MMS standards or proprietary fields. The only header field which has to be present in the "SEND MM" command is the address of the recipient of that MM which, in the example of FIG. 1, is the address of the USAT server. Upon reception of the "SEND MM" command, the ME adds these header fields, as defined in the "SEND MM" command, as MMS header fields into the MM to be sent. |
| USAT application server address | The USAT application server address consists of the address of the USAT application server (or VASP application server), to which the ME has to send the MM. |

EXAMPLE 1b

Figure 3:
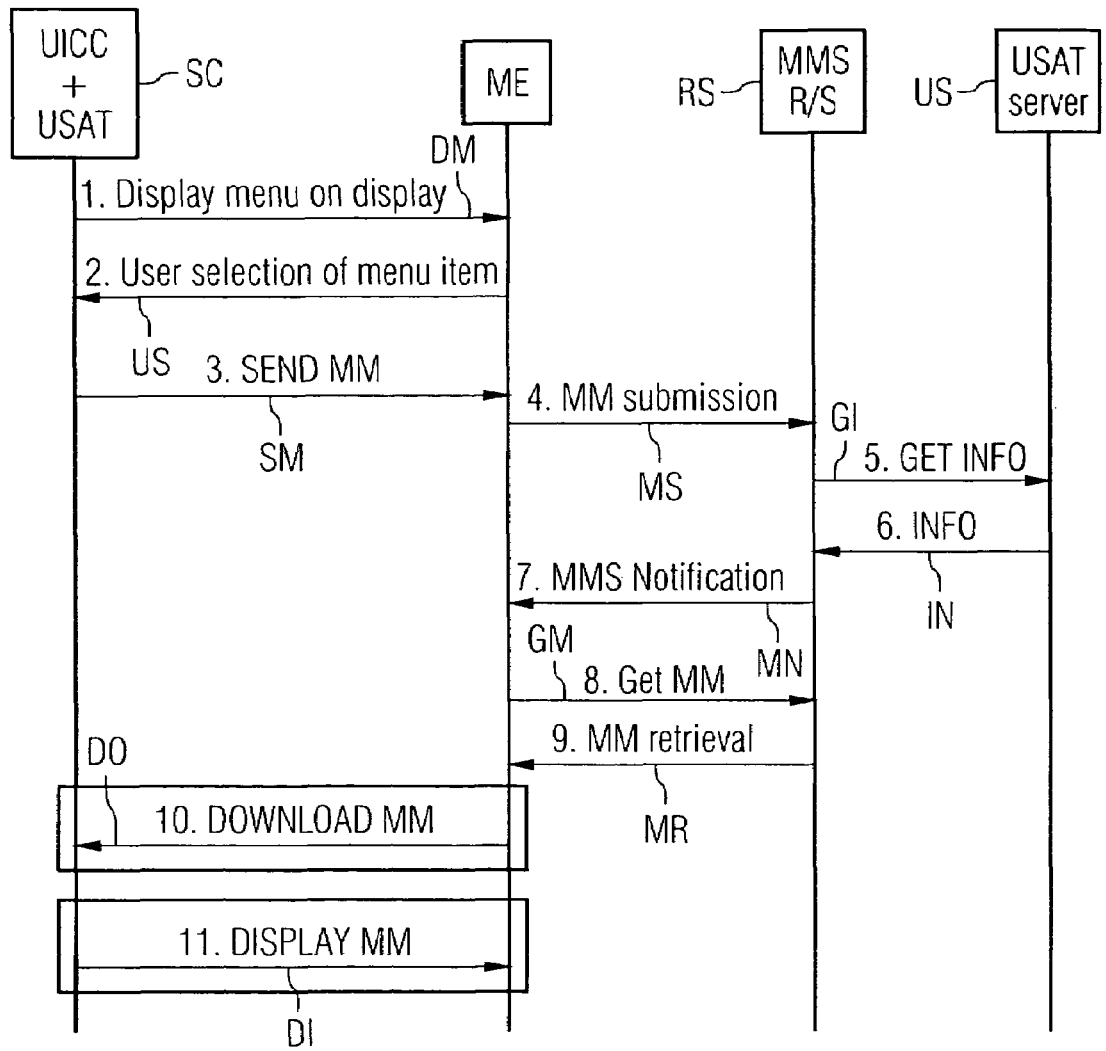
FIG. 3 illustrates a second signalling scheme between the smart card, the telecommunication device and the components of the telecommunication network of FIG. 1 for controlling the retrieval of a respective multimedia message from the telecommunication network via the telecommunication device to the smart card according to a second embodiment of the present invention.
Figure 4:
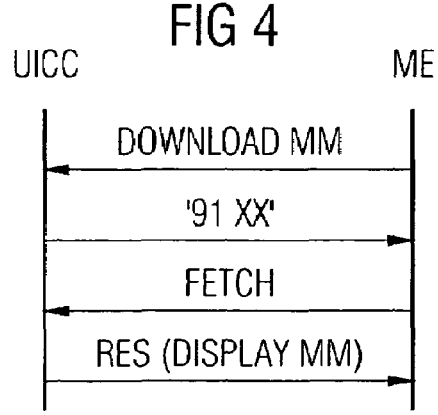
FIG. 4 illustrates as a detail of the signalling scheme of FIG. 3 the interaction of commands between the smart card and the telecommunication device to get a "display MM command" to be sent from the smart card to the telecommunication device, thus initiating the telecommunication device to display the respective multimedia message being previously downloaded to the smart card from the network.

Instead of letting the user decide if he/she wants to download the received MM as in the example of FIG. 1 above, (with the weather forecast of Berlin, Germany), the present invention also defines the download of an MM without any user interaction. This is shown in FIG. 3. The functionality of the commands with the sequence numbers 1–6 in FIG. 3 is the same as described above for FIG. 1. The MM will be retrieved by the ME according to the well-known MMS behavior; e.g., with immediate retrieval (commands MN, GM, MR with sequence numbers 7–9 in FIG. 3). According to this embodiment of the present invention, this MM may contain a respective information element, called "MMS bearer". This "MMS bearer" information element may, for example, be a flag, which can be set to (1), which refers to the MMS being used as bearer service, or not set to (0), which refers to the MMS not being used as bearer service. This "MMS bearer" information element can be part of any MMS message which terminates at the telecommunication device, particularly terminal ME; e.g., MMs, MMS notifications, MMS delivery reports or MMS read-reply reports. In this example, MMS is used as bearer service for USAT, wherein the "MMS bearer" information element in the MM received by the MMS User Agent is set to (1). The MMS User Agent on the terminal ME checks the "MMS bearer" information element and sees that MMS is used as bearer (flag is set to (1)). The MMS User Agent will send the MM with the ENVELOPE (DOWNLOAD MM) command DO to USAT (command DO indicated by sequence number 10 in FIG. 3) on the smart card SC, without displaying the MM to the user or alerting the user. With that the data conveyed in the MMS message (or parts of it) are transferred from the terminal ME to the smart card SC.

Optionally, the UICC may additionally send the proactive UICC command "DISPLAY MM" to the ME. With the information in this MM (in this case, the weather information of Berlin), the ME displays the weather forecast of Berlin on the display.

The first advantageous USAT mechanism in this example is the ENVELOPE (DOWNLOAD MM) command DO, which is used to download the MM from the ME to the UICC (see FIG. 3, command DO indicated by sequence number 10).

This ENVELOPE (DOWNLOAD MM) command DO preferably contains the following information according to Table 2:

TABLE 2

Command parameters of the ENVELOPE (DOWNLOAD MM) command.

| Command parameter | Description |
| --- | --- |
| Command details | The command details conveyed in the "ENVELOPE (DOWNLOAD MM)" (copy and paste error) command contain information to the user command (in this case, the "ENVELOPE (DOWNLOAD MM)" command). See Table 1: command details for comments It consists of, for example: A command number, which identifies the command in case of multiple ongoing commands. That is, the command number conveyed in the "ENVELOPE (DOWNLOAD MM)" command is copied by the ME into a response to this command. As such, it allows for an unambiguous mapping of responses to commands by the UICC. |

TABLE 2-continued

Command parameters of the ENVELOPE (DOWNLOAD MM) command.

| Command parameter | Description |
| --- | --- |
| | A type of command which identifies the command, in this case the "ENVELOPE (DOWNLOAD MM)" command. A command qualifier to the user "ENVELOPE (DOWNLOAD MM)" command. |
| Device entities | The device entities consist of the source identity, which identifies the source device (here, ME), and the destination identity, which identifies the destination device (here, UICC). |
| MM | The MM consists of the Multimedia Message (inclusive attachments), as it is received by the MMS User Agent. |

The second advantageous USAT mechanism in this example is the proactive UICC command "DISPLAY MM" (denoted by reference sign DI in FIG. 3). When an MM has been downloaded to the UICC by using the USAT DOWNLOAD MM mechanisms, USAT responds with a status word ("91 XX") which indicates to the ME that a new command, in this case DISPLAY MM, has to be fetched (see FIG. 4). The ME knows what action has to be taken and displays the MM on the display of the telecommunication device ME.

The DISPLAY MM command includes the information which the ME needs to display the MM. The information preferably provided in the DISPLAY MM command is shown in Table 3 below:

TABLE 3

Command parameters of the proactive UICC command "DISPLAY MM".

| Command parameter | Description |
| --- | --- |
| Command details | The command details conveyed in the "DISPLAY MM" command contain information to the user command (in this case, the "DISPLAY MM" command). See Table 1: command details for comments. It consists of, for example: A command number, which identifies the command in case of multiple ongoing commands. That is, the command number conveyed in the "DISPLAY MM" command is copied by the ME into a response to this command. As such, it allows for an unambiguous mapping of responses to commands by the UICC. A type of command which identifies the command, in this case the "DISPLAY MM" command. A type of command which specifies the interpretation of the data objects in the "DISPLAY MM" command which follow. A command qualifier to the user "DISPLAY MM" command. |
| Device entities | The device entities consist of the source identity, which identifies the source device (here: UICC) and the destination identity (here: Display), which identifies the destination device. |
| MM | The MM consists of the Multimedia Message (inclusive attachments) as it is downloaded to the UICC. |

EXAMPLE 1c

Figure 5:
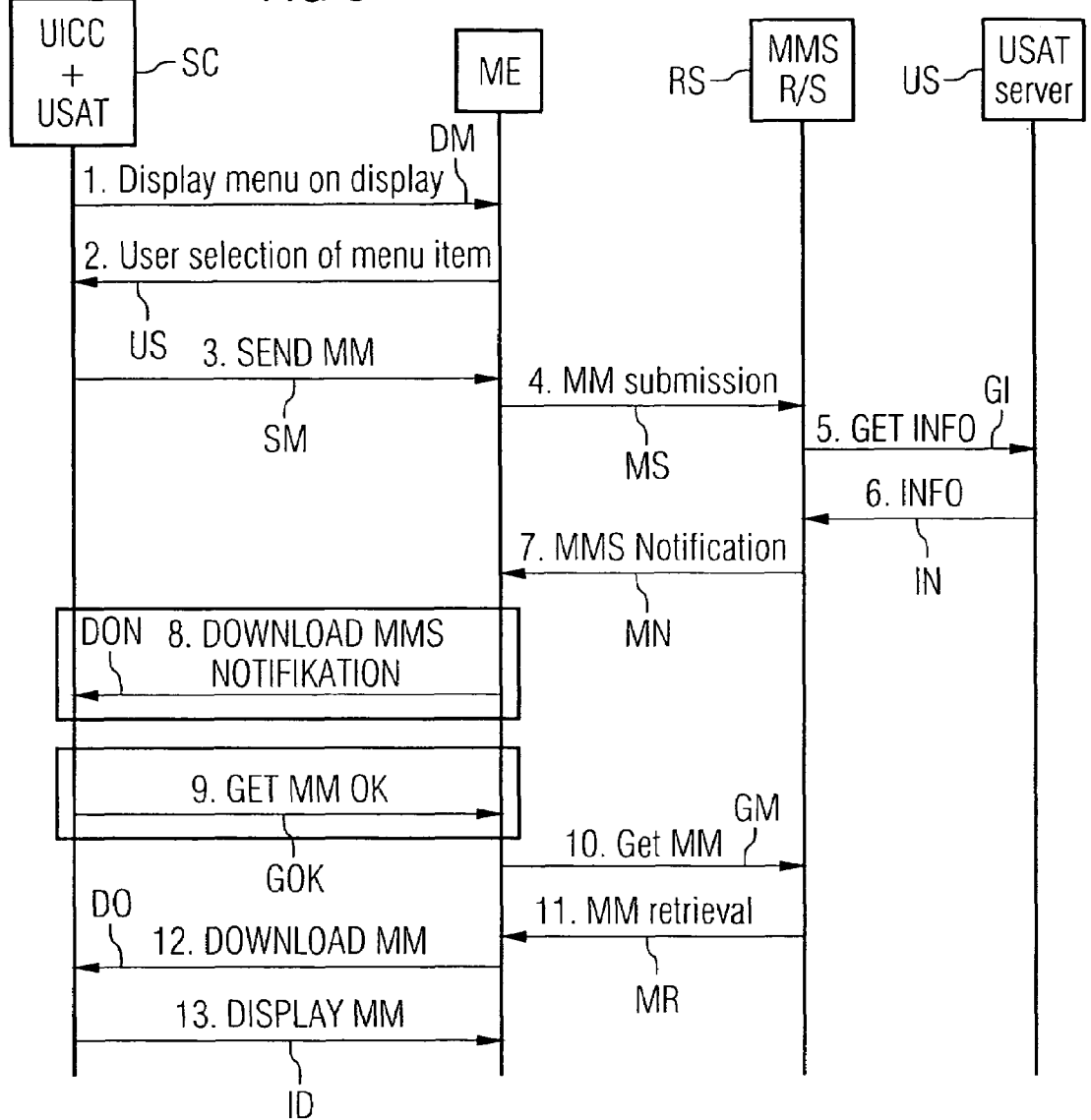
FIG. 5 illustrates a third signalling scheme between the smart card, the telecommunication device and the components of the telecommunication network of FIG. 1 for controlling the retrieval of a respective multimedia message notification from the telecommunication network to the smart card, this notification message being sent by the network to the telecommunication device in advance indicating the provision of a multimedia message in the network ready for retrieval.
Figure 6:
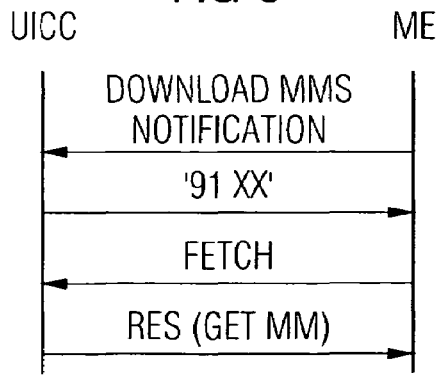
FIG. 6 illustrates as a detail of the signalling scheme of FIG. 5 the interaction of commands between the smart card and the telecommunication device to get a "get MM command" to be sent from the smart card to the telecommunication device, thus initiating the telecommunication device to retrieve the respective notified multimedia message from the network and download it to the smart card.

Another possibility to retrieve the MM without user interaction is described below with reference to the signalling scheme in FIG. 5. The functionality of the commands with sequence numbers 1–6 in FIG. 5 is the same as described above for the signalling in FIG. 1. The MMS User Agent, residing on the ME, receives an MMS notification by command MN (indicated by sequence number 7 in FIG. 5). This MMS notification contains the "MMS bearer" information element (see, also, example 1b), which is set (1); i.e., MMS is used as bearer service. The MMS User Agent on the ME checks the "MMS bearer" information element in the MMS notification and sees that MMS is used as bearer service. Based on information in the MMS notification or based on information on the ME, the MMS User Agent decides if the MMS notification will be downloaded to the UICC/USAT or if the UICC/USAT only will be informed that a new MMS notification has arrived. In this example, the MMS User Agent will pass the MMS notification directly to the UICC/USAT by command DON (indicated by sequence number 8 in FIG. 5); i.e., the MMS notification is downloaded from the ME to the UICC/USAT. USAT checks the notification to determine if the MM has to be downloaded (positive check, by USAT) or rejected (negative check of USAT). After a positive check USAT will initiate the ME (MMS UA) to download the MM by sending the proactive UICC command GET MM to the ME (command GOK in FIG. 5 indicated by sequence number 9). Now the ME can start the downloading procedure by sending a Get MM message (command GM indicated by sequence number 10 in FIG. 5) to the MMS Relay/Server RS and the MMS Relay/Server sends the MM to the ME (command MR indicated by sequence number 11 in FIG. 5). The ME starts the download MM/envelope procedures with the Download MM command (command DO indicated by sequence number 12 in FIG. 5) for downloading the MM. When these procedures are finished, the UICC sends the proactive UICC command DISPLAY MM to the ME (command DI indicated by sequence number 13 in FIG. 5) and the ME will display the video of the weather forecast of Berlin, Germany.

The ENVELOPE (DOWNLOAD MMS NOTIFICATION) command DON is the first advantageous command in this example. It is used to download the MMS Notification from the ME to the UICC (see FIG. 5, command DON).

The ENVELOPE (DOWNLOAD MMS NOTIFICATION) command preferably contains the following information according to Table 4:

TABLE 4

Command parameters of the "ENVELOPE (DOWNLOAD MMS NOTIFICATION)" command.

| Command parameter | Description |
| --- | --- |
| Command details | The command details conveyed in the "ENVELOPE (DOWNLOAD MMS NOTIFICATION)" command contain information to the user command (in this case the "ENVELOPE (DOWNLOAD MMS NOTIFICATION)" command). It consists of, for example: A command number which identifies the command in case of multiple ongoing commands. That is, the command number conveyed in the "ENVELOPE (DOWNLOAD MMS NOTIFICATION)" command is copied by the ME into a response to this command. As such, it allows for an unambiguous mapping of responses to commands by the UICC. A type of command which identifies the command, in this case the "ENVELOPE (DOWNLOAD MMS NOTIFICATION)" command. A command qualifier to the used "ENVELOPE (DOWNLOAD MMS NOTIFICATION)" command. |

TABLE 4-continued

Command parameters of the "ENVELOPE (DOWNLOAD MMS NOTIFICATION)" command.

| Command parameter | Description |
| --- | --- |
| Device entities | The device entities consist of the source identity, which identifies the source device (here, ME), and the destination identity (here, UICC), which identifies the destination device. |
| MMS notification | MMS notification consists of the MMS notification as received from the MMS User Agent |

The second advantageous USAT mechanism in this example is the proactive UICC command "GET MM" which is indicated by reference sign GOK in FIG. 5. After the MMS notification download and the positive notification check by USAT, USAT indicates with the status word "91 XX", that a new command is waiting, in this case "GET MM" (see FIG. 6). The ME fetches the data and knows, what action has to be taken, and then sends a request for MM retrieval to the MMS Relay/Server RS.

The "GET MM" command contains the information which the ME needs to send a request for MM retrieval to the MMS Relay/Server RS. The information preferably provided in the "GET MM" command GOK is shown in Table 5 below:

TABLE 5

Command parameters of the proactive UICC command "GET MM".

| Command parameter | Description |
| --- | --- |
| Command details | The command details conveyed in the "GET MM" command contains information to the user command (in this case, the "GET MM" command). It consists of, for example: A command number, which identifies the command in case of multiple ongoing commands. That is, the command number conveyed in the "GET MM" command is copied by the ME into a response to this command. As such, it allows for an unambiguous mapping of responses to commands by the UICC. A type of command which identifies the command, in this case the "GET MM)" command. A command qualifier to the used "GET MM" command. |
| Device entities | The device entities consist of the source identity, which identifies the source device (here, UICC), and the destination identity (here, ME), which identifies the destination device. |
| Get MM flag | The Get MM flag consists of a flag which indicates if the ME is allowed or not allowed to send out a request to the MMS Relay/Server to request MM retrieval. |

EXAMPLE 2

Operator X provides the subscribed users a USAT application, which allows a user to have a preview of movies and book movies in the cinema with his/her mobile terminal. This example describes, how MMS can be used as bearer by USAT for getting a preview of a movie.

EXAMPLE 2a

User Y wants to go to the cinema tonight and starts his/her movie booking application on his/her mobile terminal, to see if there are interesting movies tonight. User Y then selects movie A of the list of movies (command US indicated by sequence number 2 in FIG. 7). USAT will send the proactive UICC command SEND MM to ME (command SM indicated by sequence number 3 in FIG. 7). This message contains the information, which the ME needs to send the MM to the USAT server US for a preview of movie A. With the information included in the SEND MM command, the MMS UA, residing on the ME, composes an MM and sends it to the MMS Relay/Server RS by command MS (indicated by sequence number 4 in FIG. 7). The MMS Relay/Server RS forwards the MM to the USAT server (or VAS server) US by command GI (indicated by sequence number 5 in FIG. 7). The USAT server US reads the MM and detects that the user requests a preview of movie A. The USAT server composes an MM and includes an attachment with the preview of the movie to the MM and sends it to the MMS Relay/Server by command IN (indicated by sequence number 6 in FIG. 7). The MMS Relay/Server RS sends a notification to the ME by command MN (indicated by sequence number 7 in FIG. 7). Based on information in the MMS notification or based on information stored in the ME, the ME decides if the MMS notification will be downloaded to the UICC/USAT or if the UICC/USAT only will be informed that a new MMS notification has arrived. In this example, the ME decides to send a UICC MM NOTIFICATION to the UICC by command UMN (indicated by sequence number 8 in FIG. 7) to inform the UICC that an MM arrived at the ME. Based on the content of this command (e.g., types of attachment, sizes, headers, etc.) USAT decides which content has to be downloaded and then sends the command GET MM ATTACHMENT REQUEST (command GAR indicated by sequence number 9 in FIG. 7) to the ME to request that the needed MM attachment will be downloaded. In this example, the attachment "preview of movie A" is requested to be downloaded. The ME will download the attachment by sending the ENVELOPE (DOWNLOAD MMS ATTACHMENT) command (command DOA indicated by sequence number 10 in FIG. 7). After downloading the attachment, USAT can send the DISPLAY MMS ATTACHMENT command (command DIA indicated by sequence number 11 in FIG. 7) to the ME for displaying the attachment to the user. In this example, the preview of movie A will be displayed to the user.

Figure 7:
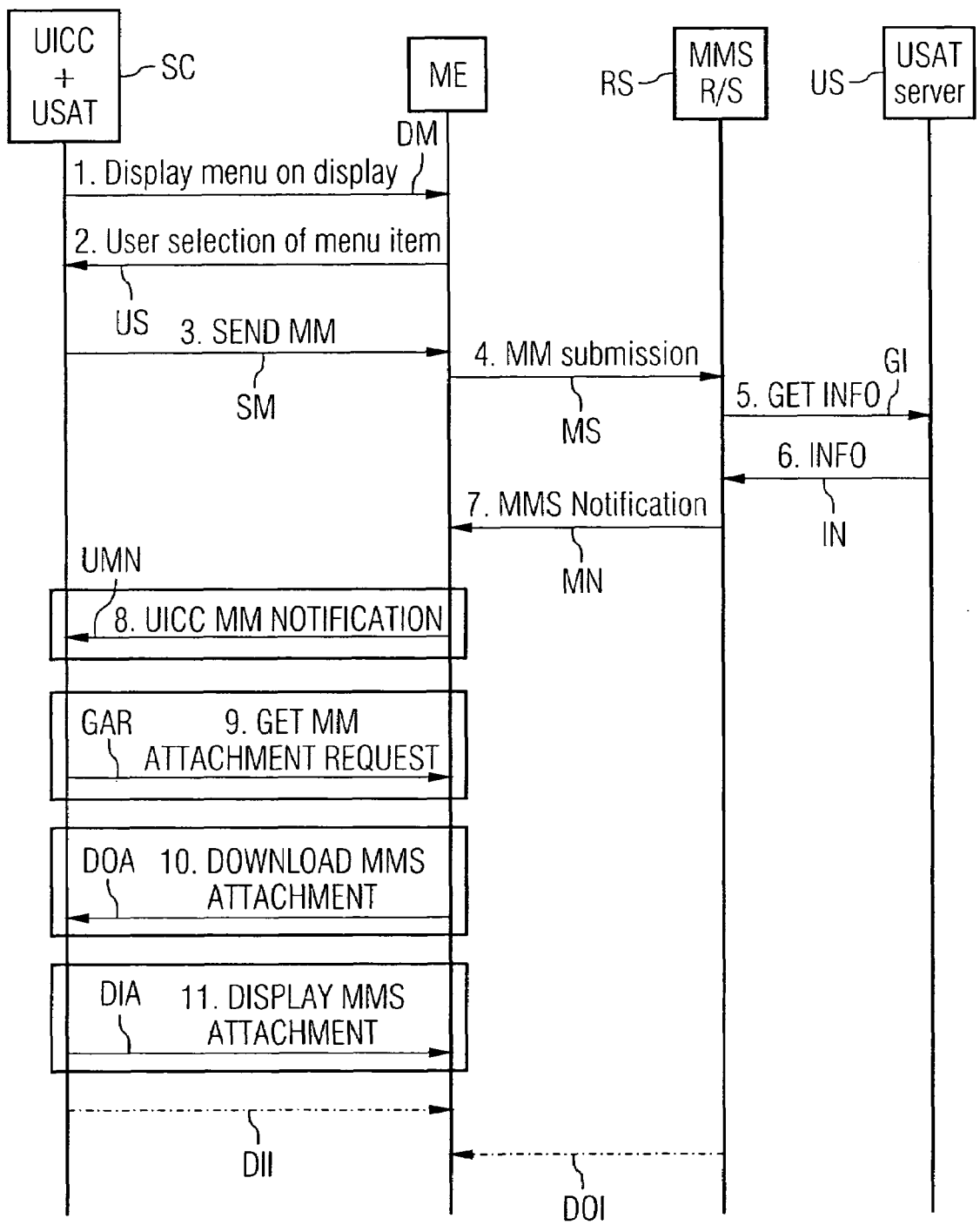
FIG. 7 illustrates a further signalling scheme between the smart card, the telecommunication device and the components of the telecommunication network of FIG. 1 for controlling the retrieval of an attachment of a respective multimedia message notification from the telecommunication network to the smart card.
Figure 8:
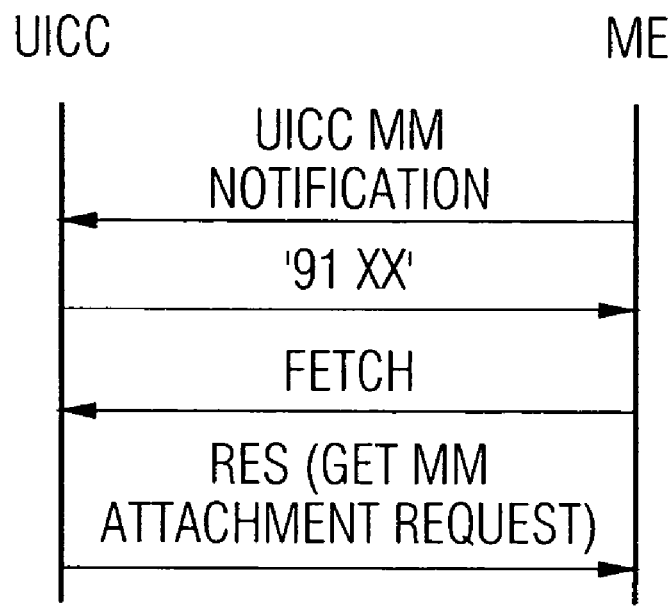
FIGS. 8, 9 illustrates as a detail of the signalling scheme of FIG. 7 the interaction of commands between the smart card and the telecommunication device to get a "get MM attachment command" to be sent from the smart card to the telecommunication device, thus initiating the telecommunication device to retrieve the attachment of the respective multimedia message from the network, to download it to the smart card, and/or to display the attachment.
Figure 9:
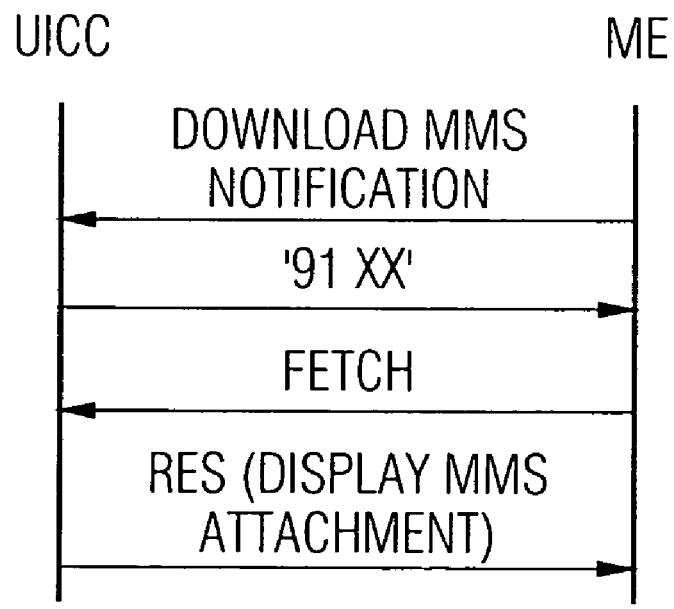

The first advantageous USAT mechanism in this example is the UICC MM NOTIFICATION command UMN, which is used by the ME to inform the UICC that a new MM has arrived at the ME (see FIG. 7, command UMN).

The UICC MM NOTIFICATION command preferably contains the following information according to Table 6:

TABLE 6

Command parameters of the "UICC MM NOTIFICATION" command.

| Command parameter | Description |
| --- | --- |
| Command details | The command details conveyed in the "UICC MM NOTIFICATION" command contain information to the user command (in this case, the "UICC MM NOTIFICATION" command). It consists of, for example: |

TABLE 6-continued

Command parameters of the "UICC MM NOTIFICATION" command.

| Command parameter | Description |
| --- | --- |
| | A command number which identifies the command in case of multiple ongoing commands. That is, the command number conveyed in the "UICC MM NOTIFICATION" command is copied by the ME into a response to this command. As such, it allows for an unambiguous mapping of responses to commands by the UICC. A type of command which identifies the command, in this case the "UICC MM NOTIFICATION)" command. A command qualifier to the used "UICC MM NOTIFICATION" command. |
| Device entities | The device entities consist of the source identity, which identifies the source device (here, ME) and the destination identity (here, UICC), which identifies the destination device. |
| MM content ID | The MM content ID contains the IDs of the attachments. Every attachment will have its own number which can be used to identify the attachment in case of a GET ATTACHMENT REQUEST. |
| MM content types | The MM content types consist of information regarding which kind of attachment types are used in the MM content; e.g., .mp3, .gif, etc. |
| MM content size | The MM content size consists of the sizes of the attachments. Based on this information, the UICC can decide if the MM has to be downloaded. |

The second advantageous USAT mechanism in this example is the proactive UICC command "GET MM ATTACHMENT REQUEST". When USAT has received a UICC MM NOTIFICATION command and has decided to download one or more attachments, the USAT indicates with the status word "91 XX" that a new proactive UICC command is waiting; in this case, "GET MM ATTACHMENT REQUEST" (see FIG. 8). The ME fetches the data and knows what action has to be taken, and then displays the MM on the display.

The GET MM ATTACHMENT REQUEST command contains the information which the ME needs to request the needed attachment. The information preferably provided in the GET MM ATTACHMENT REQUEST command is shown in Table 7 below:

TABLE 7

Command parameters of the proactive UICC command "GET MM ATTACHMENT REQUEST".

| Command parameter | Description |
| --- | --- |
| Command details | The command details conveyed in the "GET MM ATTACHMENT REQUEST" command contain information to the user command (in this case, the "GET MM ATTACHMENT REQUEST" command). It consists of, for example: A command number which identifies the command in case of multiple ongoing commands. That is, the command number conveyed in the "GET MM ATTACHMENT REQUEST" command is copied by the ME into a response to this command. As such it allows for an unambiguous mapping of responses to commands by the UICC. A type of command, which identifies the command, in this case the "GET MM ATTACHMENT REQUEST)" command. |

TABLE 7-continued

Command parameters of the proactive UICC command "GET MM ATTACHMENT REQUEST".

| Command parameter | Description |
| --- | --- |
| | A command qualifier to the user "GET MM ATTACHMENT REQUEST" command. |
| Device entities | The device entities consist of the source identity, which identifies the source device (here, UICC) and the destination identity (here, ME), which identifies the destination device. |
| MM content ID | The MM content ID contains the IDs of the attachments. Every attachment will have its own number. This is the number of the requested attachment. |

The third advantageous USAT mechanism in this example is the ENVELOPE (DOWNLOAD MMS ATTACHMENT) command, which is used to download the MM from the ME to the UICC (see FIG. 7, command DOA).

This ENVELOPE (DOWNLOAD MMS ATTACHMENT) command preferably contains the following information according to Table 8:

TABLE 8

Command parameters of the "ENVELOPE (DOWNLOAD MMS ATTACHMENT)" command.

| Command parameter | Description |
| --- | --- |
| Command details | The command details conveyed in the "ENVELOPE (DOWNLOAD MMS ATTACHMENT)" command contain information to the user command (in this case, the "ENVELOPE (DOWNLOAD MMS ATTACHMENT)" command). See Table 1: command details for comments. It consists of, for example: A command number which identifies the command in case of multiple ongoing commands. That is, the command number conveyed in the "ENVELOPE (DOWNLOAD MMS ATTACHMENT)" command is copied by the ME into a response to this command. As such it allows for an unambiguous mapping of responses to commands by the UICC. A type of command which identifies the command, in this case the "ENVELOPE (DOWNLOAD MMS ATTACHMENT)" command. A command qualifier to the user "ENVELOPE (DOWNLOAD MMS ATTACHMENT)" command. |
| Device entities | The device entities consist of the source identity, which identifies the source device (here, ME) and the destination identity (here, UICC), which identifies the destination device. |
| MM content ID | The MM content ID contains the IDs of the attachments. Every attachment will have its own number. This is the number of the requested attachment. |
| MM content types | The MM content types consist of information regarding which kind of attachment types are used in the MM content; e.g., mp3, .gif, etc. |
| MMS attachment | The MMS attachment consists of the MMS attachment(s) which needs to be downloaded to the UICC. |
| Link to attachment | Link to attachment consists of the link of the attachment stored on the ME. |

The last advantageous USAT mechanism in this example is the proactive UICC command "DISPLAY MMS ATTACHMENT". When an MM has been downloaded to the UICC by using the DOWNLOAD MMS ATTACHMENT mechanisms, USAT indicates that a new proactive UICC command is waiting; in this case, "DISPLAY MMS ATTACHMENT" (see FIG. 9). The ME fetches the data and knows what action has to be taken, and then displays the MM on the display.

This DISPLAY MMS ATTACHMENT command contains the information which the ME needs to display the MM attachment. The information preferably provided in the DISPLAY MMS ATTACHMENT command is shown in Table 9 below:

TABLE 9

Command parameters of the proactive UICC command "DISPLAY MMS ATTACHMENT".

| Command parameter | Description |
| --- | --- |
| Command details | The command details conveyed in the "DISPLAY MMS ATTACHMENT" command contain information to the user command (in this case, the "DISPLAY MMS ATTACHMENT" command). See Table 1: command details for comments It consists of, for example: A command number which identifies the command in case of multiple ongoing commands. That is, the command number conveyed in the "DISPLAY MMS ATTACHMENT" command is copied by the ME into a response to this command. As such it allows for an unambiguous mapping of responses to commands by the UICC. A type of command which identifies the command, in this case the "DISPLAY MMS ATTACHMENT" command. A command qualifier to the user "DISPLAY MMS ATTACHMENT" command. |
| Device entities | The device entities consist of the source identity, which identifies the source device (here, UICC) and the destination identity (here, Display), which identifies the destination device. |
| MM content types | The MM content types consist of information regarding which kind of attachment types are used in the MM content; e.g., mp3, .gif, etc. |
| MMS attachment | The MMS attachment consists of the Multimedia Message attachment which should be displayed by the ME. |

EXAMPLE 2b

It is also possible to download a link to an MMS attachment instead of downloading the MMS attachment. This is described below with reference to FIG. 10. The functionality of the commands indicated by sequence number 11–8 in FIG. 10 is the same as described above for example 2a of FIG. 7. Instead of requesting an MM attachment, USAT also can request that the ME should store the MM attachments on the ME and that the ME should send a link to the attachments to the UICC. This can be done by sending a proactive UICC command "MM TERMINAL STORAGE MESSAGE" (command TS indicated by sequence number 9 in FIG. 10) from the USAT to the ME which tells the ME, that it has to store the MM attachment. The ME will send a link to the attachment back with an ENVELOPE (DOWNLOAD MMS LINK) command (command DML indicated by sequence number 10 in FIG. 10) to the UICC.

Two advantageous USAT commands/mechanisms are introduced in this example. The first new command is the proactive UICC command "MM TERMINAL STORAGE MESSAGE". This command consists of information which the ME needs to store the MM attachment on the ME and to send a link back to the attachment. When the UICC is informed that an MM has arrived at the ME, USAT indicates with the status word "91 XX", that a new proactive UICC command is waiting, in this case "MM TERMINAL STORAGE" (see FIG. 11). The ME fetches the data and knows what action has to be taken, and then stores the MM attachment on the ME and sends the link to the UICC.

The information preferably provided in the MM TERMINAL STORAGE command is shown in Table 10 below:

TABLE 10

Command parameters of the proactive UICC command "MM TERMINAL STORAGE" message.

| Command parameter | Description |
|---|---|
| Command details | The command details conveyed in the "MM TERMINAL STORAGE" command contain information to the user command (in this case, the "MM TERMINAL STORAGE" command). It consists of, for example: A command number which identifies the command in case of multiple ongoing commands. That is, the command number conveyed in the "MM TERMINAL STORAGE" command is copied by the ME into a response to this command. As such, it allows for an unambiguous mapping of responses to commands by the UICC. A type of command which identifies the command, in this case the "MM TERMINAL STORAGE" command. A command qualifier to the user "MM TERMINAL STORAGE" command. |
| Device entities | The device entities consist of the source identity, which identifies the source device (here, UICC) and the destination identity (here, ME), which identifies the destination device. |
| MM attachment storage | MM attachment storage on ME storage consists of the information that the MM attachment has to be stored on the ME. |
| Link to MM attachment request | The link to MM attachment request consists of the information if a link to the MM attachment is requested or not. |

The second advantageous USAT mechanism in this example is the ENVELOPE (DOWNLOAD MMS LINK) command which is used to download the MMS link from the ME to the UICC (see FIG. 10, command DML).

This ENVELOPE (DOWNLOAD MM) command preferably contains the following information according to Table 11:

TABLE 11

Command parameters of the "ENVELOPE (DOWNLOAD MMS LINK)" command.

| Command parameter | Description |
|---|---|
| Command details | The command details conveyed in the "ENVELOPE (DOWNLOAD MMS LINK)" command contain information to the user command (in this case, the "ENVELOPE (DOWNLOAD MMS LINK)" command). It consists of, for example: A command number which identifies the command in case of multiple ongoing commands. That is, the command number conveyed in the "ENVELOPE (DOWNLOAD MMS LINK)" command is copied by the ME into a response to this command. As such, it allows for an unambiguous mapping of responses to commands by the UICC. A type of command which identifies the command, in this case the "ENVELOPE (DOWNLOAD MMS LINK)" command. A command qualifier to the user "ENVELOPE (DOWNLOAD MMS LINK)" command. |

TABLE 11-continued

Command parameters of the "ENVELOPE (DOWNLOAD MMS LINK)" command.

| Command parameter | Description |
|---|---|
| Device entities | The device entities consist of the source identity, which identifies the source device (here, ME) and the destination identity (here, UICC), which identifies the destination device. |
| Link to attachment | Link to attachment consists of the link of the attachment stored on the ME. |

EXAMPLE 3

Instead of having many different USAT commands for using MMS as bearer service for USAT, it could be advantageous to combine several of these commands.

The ENVELOPE (DOWNLOAD MMS) command, used for downloading MMS information, can replace the ENVELOPE (DOWNLOAD MM), ENVELOPE (DOWNLOAD MMS NOTIFICATION), ENVELOPE (DOWNLOAD MMS ATTACHMENT) and ENVELOPE (DOWNLOAD MMS LINK) commands. This ENVELOPE (DOWNLOAD MMS) command preferably may contain the following information according to Table 12:

TABLE 12

Command parameters of the "ENVELOPE (DOWNLOAD MMS)" command.

| Command parameter | Description |
|---|---|
| Command details | The command details conveyed in the "ENVELOPE (DOWNLOAD MMS)" command contain information to the user command (in this case, the "ENVELOPE (DOWNLOAD MMS)" command). It consists of, for example: A command number which identifies the command in case of multiple ongoing commands. That is, the command number conveyed in the "ENVELOPE (DOWNLOAD MMS)" command is copied by the ME into a response to this command. As such, it allows for an unambiguous mapping of responses to commands by the UICC. A type of command, which identifies the command, in this case the "ENVELOPE (DOWNLOAD MMS)" command. A command qualifier to the user "ENVELOPE (DOWNLOAD MMS)" command. |
| Device entities | The device entities consist of the source identity, which identifies the source device (here, ME) and the destination identity (here, UICC), which identifies the destination device. |
| MMS download identifier | The MMS download identifier contains the information regarding what kind of data has to be downloaded (MM, MMS notification, MMS attachment, MMS link, etc.) This MMS download identifier can be one or more bytes, consisting of a list of all the data that can be downloaded. It includes a bit for the special MMS information set, whereupon the MMS information will be downloaded. |
| MM | The MM consists of the Multimedia Message as it is received from the MMS User Agent. |
| MMS notification | MMS notification consists of the MMS notification as received from the MMS User Agent |
| MM content ID | The MM content ID contains the IDs of the attachments. Every attachment will have its own number. This is the number of the requested attachment. |
| MM content types | The MM content types consist of information regarding which kind of attachment types are used in the MM content; e.g., .mp3, .gif, etc. |

TABLE 12-continued

Command parameters of the "ENVELOPE
(DOWNLOAD MMS)" command.

| Command parameter | Description |
| --- | --- |
| MMS attachment | The MMS attachment consists of the MMS attachment(s) which needs to be downloaded to the UICC. |
| Link to attachment | Link to attachment consists of the link of the attachment stored on the ME. |

In a similar way the "DISPLAY MM" command and the "DISPLAY MMS ATTACHMENT" command can be combined into one command: "DISPLAY MMS". This "DISPLAY MMS" command preferably contains the following information according to Table 13:

TABLE 13

Command parameters of the proactive
UICC command "DISPLAY MMS".

| Command parameter | Description |
| --- | --- |
| Command details | The command details conveyed in the "DISPLAY MMS" command contain information to the user command (in this case, the "DISPLAY MMS" command).<br>It consists of, for example:<br>A command number which identifies the command in case of multiple ongoing commands. That is, the command number conveyed in the "DISPLAY MMS" command is copied by the ME into a response to this command. As such, it allows for an unambiguous mapping of responses to commands by the UICC.<br>A type of command which identifies the command, in this case the "DISPLAY MMS" command.<br>A command qualifier to the user "DISPLAY MMS" command. |
| Device entities | The device entities consist of the source identity, which identifies the source device (here, UICC) and the destination identity (here, Display), which identifies the destination device. |
| MMS display identifier | The MMS display identifier contains the information regarding what kind of data has to be displayed on the display (MM, MM attachment, etc.)<br>This MMS download identifier can be one or more bytes, consisting of a list of all the data that can be downloaded.<br>It includes a bit for the special MMS information set, whereupon the MMS information will be displayed. |
| MM | The MM consists of the Multimedia Message as it is downloaded to the UICC. |
| MM content types | The MM content types consist of information regarding which kind of attachment types are used in the MM content; e.g., mp3, .gif, etc. |
| MMS attachment | The MMS attachment consists of the Multimedia Message attachment which should be displayed by the ME. |

The inventive controlling principles described enable an operator to use the non-real time MMS for transporting data to and from a (operator-defined) proprietary (U)SAT application residing on a smart card which is plugged into or coupled with a telecommunication device, particularly a mobile device. It also gives an operator the opportunity to use multimedia content from a (U)SAT application, which until now has been limited to text and icons. For the use of Multimedia Messaging Service as a transport mechanism for (U)SAT, there preferably are provided those above-described SAT/USAT commands/mechanisms. Thus, a functionality (e.g. CAT/SAT/USAT commands/mechanisms) is now available for an operator to use the non-realtime MMS for transporting data to and from a smart card in a mobile device (i.e., to handle MMS or MMS content), when MMS is used as bearer service for CAT/SAT/USAT.

In sum, a functionality for an operator is accomplished to use the non-realtime MMS for transporting data to and from a smart card in a telecommunication device, particularly a mobile device, and the inventive display of multimedia data is elaborated in detail. For such purpose, new commands/mechanisms between a smart card and the telecommunication device are generated, which enable an (operator-defined) application running on the smart card (which is plugged into the mobile device) to request the mobile device to execute MMS-specific functionality (which runs on the mobile device). As such, for example, (U)SAT is allowed to handle MMS as bearer service.

It is an advantage of the proposed (U)SAT mechanisms and commands that the usage of these (U)SAT mechanisms and commands is independent of the particular mobile equipment (i.e., mobile phone) that the user uses at a certain point of time. The (U)SAT functionality is processed on the SIM or the USIM on the UICC, which can be plugged into telecommunication equipment (particularly mobile) or an apparatus connected or coupled with a terminal.

Moreover, the above described (U)SAT mechanisms and commands are advantageously independent of the particular operator or UICC/SIM card manufacturer. As such, third-party application developers can create applications based on these (U)SAT mechanisms which are platform-independent and can sell these applications to any operator and/or any UICC/SIM card manufacturer. These applications can make use of the inventively proposed (U)SAT mechanisms and commands. Favorable steps of the present invention that include, in particular:

CAT, SAT, USAT commands/mechanisms available to handle MMS or MMS content, when MMS is used as bearer service for CAT, SAT or USAT.

New CAT, SAT, USAT functionality:

UICC/SIM requesting from ME to provide MMS functionality:

The UICC/SIM requests from the MMS User Agent on the ME to compose an MM, with the information in this including a SEND MM command.

The UICC/SIM requests from the ME to display an MM on the mobile's display, with the information in this including a DISPLAY MM command.

The UICC/SIM requests from the ME to download the MM from the MMS Relay/Server, with the information in this including a DISPLAY MM command.

The UICC/SIM requests from the ME to download the MM attachment from the ME to the UICC/SIM, with the information in this including a GET MM ATTACHMENT REQUEST command.

The UICC/SIM requests from the ME to display an MM attachment, with the information in this including a DISPLAY MMS ATTACHMENT command.

The UICC/SIM requests from the ME to store an MM in the terminal, with the information in this including a MM TERMINAL STORAGE MESSAGE command.

Terminal transferring data transported over MMS from the ME to the UICC/SIM:

The ME will download the MM from the ME to the UICC/SIM.

The ME will download the MMS notification from the ME to the UICC/SIM.

The ME will download the MMS attachment(s) from the ME to the UICC/SIM.

The ME will download the link to MMs or MMS attachment(s) from the ME to the UICC/SIM.

The ME will inform the UICC/SIM that a new MM has arrived at the ME.

Favorable variations/alternatives for the above described new CAT, SAT, USAT functionality are:

New (U)SAT commands and mechanisms for MMS are:
  Commands sent from the UICC/SIM to the ME according to attached Table 14.
  Commands sent from the ME to the UICC/SIM according to attached Table 15.
The possibility to have one general command for downloading MMS information from the ME to the UICC/SIM. General download MMS command according to attached Table 16.
The possibility to have one general command for displaying MMS information from the ME to the UICC/SIM. General download MMS command according to attached Table 17.

TABLE 14

Commands send from the UICC/SIM to the ME.

| Command | Description | Direction | Parameters | Comments |
| --- | --- | --- | --- | --- |
| SEND MM | The SEND MM command initiates the MMS User Agent on the ME to compose an MM, with the information in this including a SEND MM command | UICC/SIM => ME | Command details Device entities Connectivity parameters MM content Header fields (U)SAT application server address | This command can be a proactive UICC command or a command sent by the UICC itself to the ME |
| DISPLAY MM | The DISPLAY MM command initiates the ME to display an MM on the mobile's display, with the information in this including a DISPLAY MM command | UICC/SIM => ME | Command details Device entities MM | This command can be a proactive UICC command or a command sent by the UICC itself to the ME. |
| GET MM | The GET MM command initiates the ME to download the MM from the MMS Relay/Server, with the information in this including a GET MM command | UICC/SIM => ME | Command details Device entities | This command can be a proactive UICC command or a command sent by the UICC itself to the ME. |
| GET MM ATTACHMENT REQUEST | The GET MM ATTACHMENT REQUEST command initiates the ME to download the MM attachment from the ME to the UICC/SIM, with the information in this including a GET MM ATTACHMENT REQUEST command | UICC/SIM => ME | Command details Device entities MM content ID | This command can be a proactive UICC command or a command sent by the UICC itself to the ME. |
| DISPLAY MMS ATTACHMENT | The DISPLAY MMS ATTACHMENT command initiates the ME to display an MM, with the information in this including a DISPLAY MMS ATTACHMENT command | UICC/SIM => ME | Command details Device entities MM content types MMS attachment | This command can be a proactive UICC command or a command sent by the UICC itself to the ME. |
| MM TERMINAL STORAGE MESSAGE | The MM TERMINAL STORAGE MESSAGE command initiates the ME to store an MM in the terminal, with the information in this including a MM TERMINAL STORAGE MESSAGE command | UICC/SIM => ME | Command details Device entities MM attachment on storage Link to MM attachment request | This command can be a proactive UICC command or a command sent by the UICC itself to the ME. |

TABLE 15

Commands send from the ME to the UICC/SIM.

| Command | Description | Direction | Parameters | Comments |
|---|---|---|---|---|
| DOWNLOAD MM | With the DOWNLOAD MM command, the ME will download the MM from the ME to the UICC/SIM | ME => UICC/SIM | Command details Device entities MM | This command can be a (U)SAT ENVELOPE/DOWNLOAD command or other command sent by the ME to the UICC |
| DOWNLOAD MMS NOTIFICATION | With the DOWNLOAD MMS NOTIFICATION command, the ME will download the MMS notification from the ME to the UICC/SIM | ME => UICC/SIM | Command details Device entities MMS notification | This command can be a (U)SAT ENVELOPE/DOWNLOAD command or other command sent by the ME to the UICC |
| DOWNLOAD MMS ATTACHMENT | With the DOWNLOAD MMS ATTACHMENT command, the ME will download the MMS attachment(s) from the ME to the UICC/SIM | ME => UICC/SIM | Command details Device entities MM content ID MM content types Link to attachment MMS attachment | This command can be a (U)SAT ENVELOPE/DOWNLOAD command or other command sent by the ME to the UICC |
| DOWNLOAD MMS LINK | With the DOWNLOAD MMS LINK command, the ME will download the link to MMs or MMS attachment(s) from the ME to the UICC/SIM | ME => UICC/SIM | Command details Device entities Link to attachment | This command can be a (U)SAT ENVELOPE/DOWNLOAD command or other command sent by the ME to the UICC |
| UICC MM NOTIFICATION | With the UICC MM NOTIFICATION command, the ME will inform the UICC that a new MM has arrived at the ME | ME => UICC/SIM | Command details Device entities MM content ID MM content types MM content size | This command is implemented as an (U)SAT event. |

TABLE 16

General DOWNLOAD MMS command.

| Command | Description | Direction | Parameters | Comments |
|---|---|---|---|---|
| DOWNLOAD MMS | With the DOWNLOAD MMS command, the ME will download the MMS information from the ME to the UICC/SIM. The MMS download identifier contains the information regarding what kind of data has to be downloaded (MM, MMS notification, MMS attachment, MMS link, etc.). This MMS download identifier can be one or more bytes, consisting of a list of all the data that can be downloaded. | ME => UICC/SIM | Command details Device entities MMS download identifier MM MMS notification MM content ID MM content types MMS attachment Link to attachment | This comment can be a (U)SAT ENVELOPE/DOWNLOAD command or other command sent by the ME to the UICC/SIM |

TABLE 17

General DISPLAY MMS command.

| Command | Description | Direction | Parameters | Comments |
|---|---|---|---|---|
| DISPLAY MMS | The DISPLAY MMS command initiates the ME to display MMS | UICC/SIM => ME | Command details Device entities MMS display identifier | This command can be a proactive |

TABLE 17-continued

General DISPLAY MMS command.

| Command | Description | Direction | Parameters | Comments |
|---|---|---|---|---|
| | information on the mobile's display, with the information in this including a DISPLAY MMS command. The MMS display identifier contains the information regarding what kind of data has to be displayed on the display (MM, MM attachment, etc.). This MMS download identifier can be one or more bytes, consisting of a list of all the data that can be downloaded. | | MM MM content types MMS attachment | UICC/SIM command or a command sent by the UICC/SIM itself to the ME. |

Although the present invention has been described with reference to specific embodiments, those of skill in the art will recognize that changes may be made thereto without departing from the spirit and scope of the present invention as set forth in the hereafter appended claims.

The invention claimed is:

1. A method for controlling a multimedia messaging service between a telecommunication device and a telecommunication network, the method comprising the steps of:
controlling commands and data transfer of each multimedia message to and from the telecommunication device via via a smart card coupled to the telecommunication device;
exchanging the commands between the telecommunication device and the smart card for handling
at least one of a complete multimedia message, at least a part of a multimedia message, a multimedia message and notification,
at least one reference to at least a part of a multimedia messaging notification, multimedia messaging related information, and
at least one reference to at least a part of multimedia messaging related information;
transmitting the commands from the telecommunication device to the smart card to effect transfer of multimedia messaging service related information from the smart card to the telecommunication device, wherein the commands include at least a download MM command for transmitting the multimedia message from the telecommunication device to the smart card for retrieving a multimedia message; and
generating the download MM command by the telecommunication device upon at least one of an identifier being present in the received multimedia message and receipt of a multimedia message notification for indicating smart card controlled MMS interaction between the smart card and the telecommunication device.

2. A method for controlling a multimedia messaging service as claimed in claim 1, wherein the step of controlling is performed by one of a CAT, an SAT and a USAT residing on the smart card.

3. A method for controlling a multimedia messaging service as claimed in claim 1, the method further comprising the step of transmitting the commands from the smart card to the telecommunication device, wherein the smart card requests the telecommunication device to provide multimedia messaging service functionality.

4. A method for controlling a multimedia messaging service as claimed in claim 1, the method further comprising the step of transmitting at least a composition and send request command from the smart card to the telecommunication device to initiate composition and submission of the multimedia message by the telecommunication device.

5. A method for controlling a multimedia messaging service as claimed in claim 4, wherein the multimedia message is composed by a user agent on the telecommunication device upon reception of the composition and send request command and based on information included in the composition and send request command, and is thereafter submitted to the telecommunication network.

6. A method for controlling a multimedia messaging service as claimed in claim 4, wherein the composition and send request command includes at least one of command details, device entities, connectivity parameters, MM content, header fields and a (U) SAT application server address.

7. A method for controlling a multimedia messaging service as claimed in claim 1, the method further comprising the step of transmitting at least a get multimedia message command from the smart card to the telecommunication device for retrieving, by the smart card, the multimedia message from the telecommunication network.

8. A method for controlling a multimedia messaging service as claimed in claim 7, wherein the multimedia message is retrieved by a user agent on the telecommunication device upon receiving the get multimedia message command and based on information included in the get multimedia message command.

9. A method for controlling a multimedia messaging service as claimed in claim 7, wherein the get multimedia message command includes at least one of command details and device entities.

10. A method for controlling a multimedia messaging service as claimed in claim 1, the method further comprising the step of transmitting at least a get multimedia message attachment command from the smart card to the telecommunication device for retrieving, by the smart card, an attachment of the multimedia message from the telecommunication network.

11. A method for controlling a multimedia messaging service as claimed in claim 10, wherein the multimedia message attachment is retrieved by a user agent on the telecommunication device upon receiving the get multimedia message attachment command and based on information included in the get multimedia message attachment command.

12. A method for controlling a multimedia messaging service as claimed in claim 10, wherein the get multimedia message attachment command includes at least one of command details, device entities and an MM content ID.

13. A method for controlling a multimedia messaging service as claimed in claim 1, the method further comprising the step of transmitting at least a multimedia message terminal storage request command from the smart card to the telecommunication device for initiating storage of the multimedia message on a terminal by the telecommunication device.

14. A method for controlling a multimedia messaging service as claimed in claim 13, wherein the storage of the multimedia message on the telecommunication device is controlled by a user agent on the telecommunication device upon receiving the multimedia message terminal storage request command and based on information included in the multimedia message terminal storage request command.

15. A method for controlling a multimedia messaging service as claimed in claim 13, wherein the multimedia message terminal storage request command includes at least one of command details, device entities, an MM attachment on storage and a link to MM attachment request.

16. A method for controlling a multimedia messaging service as claimed in claim 1, the method further comprising the step of transmitting at least a display multimedia message request command from the smart card to the telecommunication device for initiating display of the multimedia message on a display of the telecommunication device by the telecommunication device.

17. A method for controlling a multimedia messaging service as claimed in claim 16, wherein the display of the multimedia message on the display of the telecommunication device is controlled by a user agent on the telecommunication device upon receiving the display multimedia message request command and based on information included in the display multimedia message request command.

18. A method for controlling a multimedia messaging service as claimed in claim 16, wherein the display multimedia message request command includes at least one of command details, device entities and an MM.

19. A method for controlling a multimedia messaging service as claimed in claim 16, the method further comprising the step of transmitting at least a general display multimedia message service information from the smart card to the telecommunication device for initiating display of various multimedia message service information on the display of the telecommunication device by the telecommunication device.

20. A method for controlling a multimedia messaging service as claimed in claim 19, wherein the display of the various multimedia message service information on the display of the telecommunication device is controlled by a user agent on the telecommunication device upon receiving the display multimedia message service information and based on information included in the display multimedia message service information.

21. A method for controlling a multimedia messaging service as claimed in claim 19, wherein the display multimedia message service information includes at least one of command details, device entities, an MMS display identifier, an MM, MM content types and an MMS attachment.

22. A method for controlling a multimedia messaging service as claimed in claim 1, the method further comprising the step of transmitting at least a display multimedia message attachment request command from the smart card to the telecommunication device for initiating display of the multimedia message attachment on a display of the telecommunication device by the telecommunication device.

23. A method for controlling a multimedia messaging service as claimed in claim 22, wherein display of the multimedia message attachment on the display of the telecommunication device is controlled by a user agent on the telecommunication device upon receiving the display multimedia message attachment request command and based on information included in the display multimedia message attachment request command.

24. A method for controlling a multimedia messaging service as claimed in claim 22, wherein the display multimedia message attachment request command includes at least one of command details, device entities, MM content types and an MMS attachment.

25. A method for controlling a multimedia messaging service as claimed in claim 1, wherein the download MM command includes at least one of command details, device entities, connectivity parameters, MM content, header fields and a (U) SAT application server address.

26. A method for controlling a multimedia messaging service as claimed in claim 1, the method further comprising the steps of:
   transmitting a download MMS notification command from the telecommunication device to the smart card for downloading a multimedia message notification from the telecommunication device to the smart card upon receiving the multimedia message notification in the telecommunication device from the telecommunication network; and
   evaluating information contained in the download MMS notification command by the smart card.

27. A method for controlling a multimedia messaging service as claimed in claim 26, the method further comprising the step of generating the download MMS notification command by the telecommunication device if an identifier is present in the received multimedia message notification for indicating smart card controlled MMS interaction between the smart card and the telecommunication device.

28. A method for controlling a multimedia messaging service as claimed in claim 26, wherein the download MMS notification command includes at least one of command details, device entities and an MMS notification.

29. A method for controlling a multimedia messaging service as claimed in claim 1, wherein the commands include a download MMS attachment command which is transmitted by the telecommunication device to the smart card for transmitting an attachment of the multimedia message from the telecommunication device to the smart card.

30. A method for controlling a multimedia messaging service as claimed in claim 29, the method further comprising the step of generating the download MM attachment command by the telecommunication device upon at least one of an identifier being present in the received multimedia message and receipt of a multimedia message notification for indicating smart card controlled MMS interaction between the smart card and the telecommunication device.

31. A method for controlling a multimedia messaging service as claimed in claim 29, wherein the download MM attachment command includes at least one of command details, device entities, an MM content ID, MM content types, a link to attachment and an MMS attachment.

32. A method for controlling a multimedia messaging service as claimed in claim 29, the method further comprising the step of storing the attachment of the multimedia message on at least one of the telecommunication device and the smart card.

33. A method for controlling a multimedia messaging service as claimed in claim 1, wherein the commands include at least a download MMS link command for transmitting a reference to at least one of a complete multimedia message, a part of a multimedia message and at least one attachment of a multimedia message from the telecommunication device to the smart card.

34. A method for controlling a multimedia messaging service as claimed in claim 33, the method further comprising the step of generating the download MMS link command by the telecommunication device upon at least one of an identifier being present in the received multimedia message and receipt of a multimedia message notification for indicating smart card controlled MMS interaction between the smart card and the telecommunication device.

35. A method for controlling a multimedia messaging service as claimed in claim 33, wherein the download MMS link command includes at least one of command details, device entities and a link to attachment.

36. A method for controlling a multimedia messaging service as claimed in claim 1, the method further comprising the step of transmitting at least a general download multimedia message service information from the telecommunication device to the smart card for downloading at least one of multimedia messages, multimedia messaging notifications, multimedia message attachments and multimedia messaging links.

37. A method for controlling a multimedia messaging service as claimed in claim 36, the method further comprising the step of downloading the download multimedia message service information by the telecommunication device upon receiving a display multimedia message service information and based on information included in the display multimedia message service information.

38. A method for controlling a multimedia messaging service as claimed in claim 1, the method further comprising the step of transmitting at least a UICC MM notification command from the telecommunication device to the smart card for informing the smart card that a new multimedia message has been received at the telecommunication device.

39. A method for controlling a multimedia messaging service as claimed in claim 38, the method further comprising the step of generating the UICC MM notification command by the telecommunication device upon at least one of an identifier being present in the received multimedia message and receipt of a multimedia message notification for indicating smart card controlled MMS interaction between the smart card and the telecommunication device.

40. A method for controlling a multimedia messaging service as claimed in claim 38, wherein the UICC MM notification command includes at least one of command details, device entities, an MM content ID, MM content types and an MM content size.

41. A telecommunication device for controlling a multimedia messaging service between the telecommunication device and a telecommunication network, comprising:
an interface for coupling the telecommunication device with a smart card; and
parts for controlling commands and data transfer of each multimedia message to and from the telecommunication device via the coupled telecommunication device and smart card;
means for exchanging the commands between the telecommunication device and the smart card for handling
at least one of a complete multimedia message, at least a part of a multimedia message, a multimedia message and notification,
at least one reference to at least a part of a multimedia messaging notification, multimedia messaging related information, and
at least one reference to at least a part of multimedia messaging related information;
means for transmitting the commands from the telecommunication device to the smart card to effect transfer of multimedia messaging service related information from the smart card to the telecommunication device, wherein the commands include at least a download MM command for transmitting the multimedia message from the telecommunication device to the smart card for retrieving a multimedia message; and
means for generating the download MM command by the telecommunication device upon at least one of an identifier being present in the received multimedia message and receipt of a multimedia message notification for indicating smart card controlled MMS interaction between the smart card and the telecommunication device.

* * * * *